US012604179B2

(12) United States Patent
Balasubramaniam et al.

(10) Patent No.: US 12,604,179 B2
(45) Date of Patent: Apr. 14, 2026

(54) METHOD FOR SERVICE SUBSCRIPTION AUDITING

(71) Applicant: NOKIA SOLUTIONS AND NETWORKS OY, Espoo (FI)

(72) Inventors: Sankaran Balasubramaniam, Bangalore (IN); Alistair Urie, Issy les Moulineaux (FR)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 345 days.

(21) Appl. No.: 18/475,751

(22) Filed: Sep. 27, 2023

(65) Prior Publication Data
US 2024/0107292 A1    Mar. 28, 2024

(30) Foreign Application Priority Data
Sep. 28, 2022    (FI) ..................................... 20225848

(51) Int. Cl.
*H04W 8/20*          (2009.01)
(52) U.S. Cl.
CPC .................................. *H04W 8/205* (2013.01)
(58) Field of Classification Search
CPC ............................. H04W 8/205; H04W 24/08
See application file for complete search history.

(56) References Cited

U.S. PATENT DOCUMENTS

| | | | |
|---|---|---|---|
| 2021/0184989 A1 | 6/2021 | Wu et al. | |
| 2024/0064826 A1* | 2/2024 | Song ..................... | H04W 92/04 |
| 2025/0234183 A1* | 7/2025 | Song ...................... | H04W 8/18 |

FOREIGN PATENT DOCUMENTS

| | | |
|---|---|---|
| CN | 114 765 623 A | 7/2022 |
| EP | 4 050 967 A1 | 8/2022 |

OTHER PUBLICATIONS

"O-RAN.WG3.E2AP-v02.00", O-RAN Working Group 3, Near-Real-time RAN Intelligent Controller, E2 Applicatio Protocol (E2AP), (2021), 89 pages. (Year: 2021).*
Extended European Search Report dated Jan. 30, 2024 corresponding to European Patent Application No. 23200399.6.

* cited by examiner

*Primary Examiner* — Barry W Taylor
(74) *Attorney, Agent, or Firm* — SQUIRE PATTON BOGGS (US) LLP

(57) ABSTRACT

An apparatus comprising means for implementing a near-real-time radio access network intelligent controller; means for detecting an event triggering a need for an auditing of active service subscriptions at an associated access node; means for transmitting a service subscription audit request to said access node; means for receiving a service subscription audit response comprising information about at least one active any existing service subscription for said near-real-time radio access network intelligent controller from said access node; and means for carrying out a procedure to ensure that a configuration of said at least one active service subscription at the near-real-time radio access network intelligent controller corresponds to the information received from the access node.

16 Claims, 6 Drawing Sheets

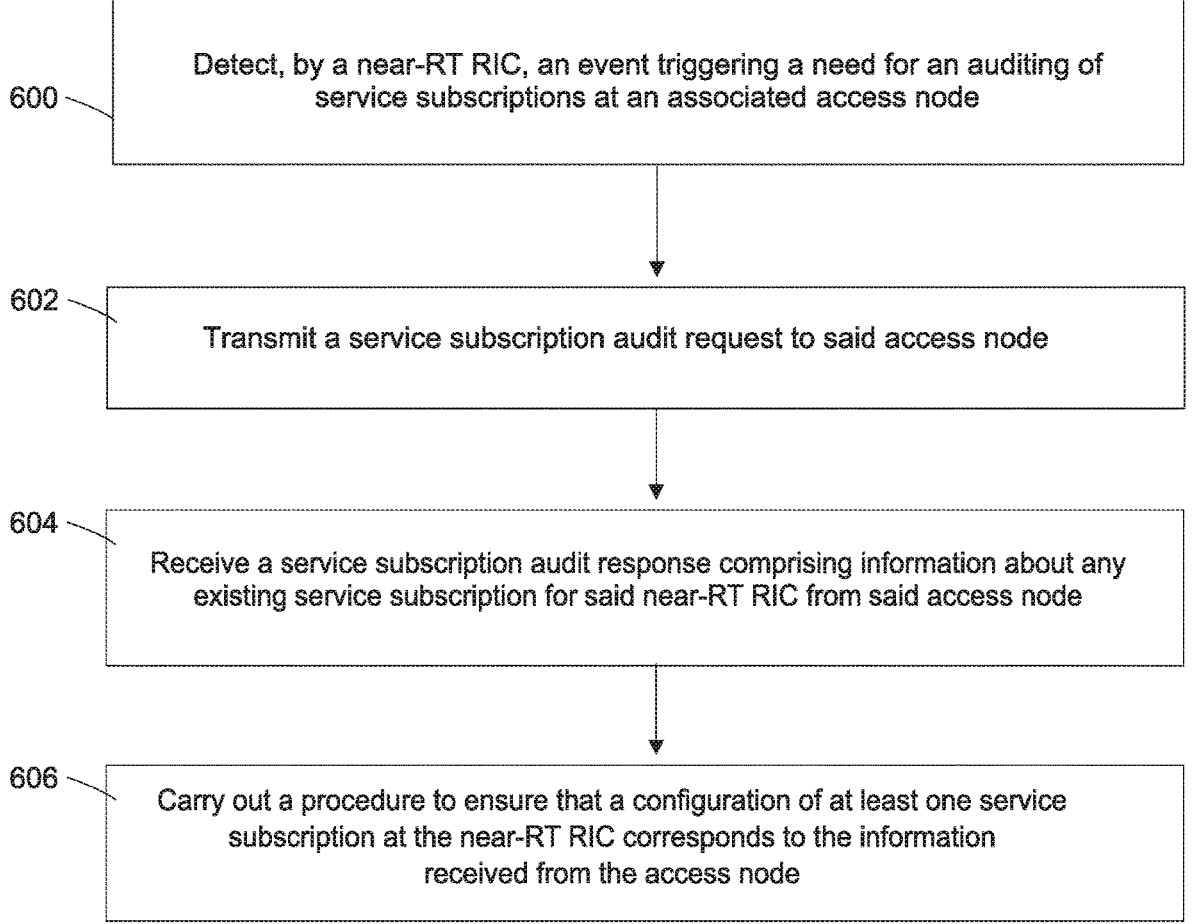

600 — Detect, by a near-RT RIC, an event triggering a need for an auditing of service subscriptions at an associated access node 602 — Transmit a service subscription audit request to said access node 604 — Receive a service subscription audit response comprising information about any existing service subscription for said near-RT RIC from said access node 606 — Carry out a procedure to ensure that a configuration of at least one service subscription at the near-RT RIC corresponds to the information received from the access node

FIG. 6

METHOD FOR SERVICE SUBSCRIPTION AUDITING

CROSS REFERENCE TO RELATED APPLICATION

This application claims priority to Finnish Application No. 20225848, filed on Sep. 28, 2022. The entire contents of the above-referenced application is hereby incorporated by reference.

TECHNICAL FIELD

The present invention relates to a service subscription auditing procedure among network entities.

BACKGROUND 5G specifications provide an option to split the internal structure of an access node gNodeB (gNB) into entities called CU (Central Unit) and one or more DUs (Distributed Unit), which are connected by a F1 interface. There may also be a RAN (Radio Access Network) intelligent controller (MC) connected through an E2 interface to the nodes gNB-DU and gNB-CU. MC is a logical function that, according to O-RAN (Open Radio Access Network) architecture (as defined by the O-RAN alliance), may be further divided into functions of a non-real-time (non-RT) MC and a near-real-time (near-RT) MC with the non-RT MC carrying out service management and orchestration (SMO) operations for one or more near-RT MC over the A1 interface. The near-RT RIC enables near-real-time control and optimization of various RAN elements (referred to as E2 Nodes) and resources via fine-grained data collection and actions by RIC services performed by one or more applications over E2 interface.

The MC services are carried out by using subscription, indication and control E2AP procedures. The E2 node is expected to store the subscribed RIC Services and act accordingly and the Near-RT MC is expected to track the list of active RIC Subscriptions.

However, there may arise various situations, where the RIC subscription database synchronization between the Near-RT RIC and the E2 Node may fail. As a result, the Near-RT RIC may have outdated information about its currently active MC subscriptions. Nevertheless, there is no mechanism for the Near-RT RIC to query the status of the currently active RIC subscriptions from the E2 Node to ensure that both nodes, i.e. the Near-RT RIC and the E2 Node, have the same list of active RIC Subscriptions.

SUMMARY

Now, an improved method and technical equipment implementing the method has been invented, by which the above problems are alleviated. Various aspects include a method, an apparatus and a non-transitory computer readable medium comprising a computer program, or a signal stored therein, which are characterized by what is stated in the independent claims. Various details of the embodiments are disclosed in the dependent claims and in the corresponding images and description.

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is provided an apparatus comprising means for detecting an event triggering a need for an auditing of service subscriptions at an associated access node; means for transmitting a service subscription audit request to said access node; means for receiving a service subscription audit response comprising information about any existing service subscription for said near-real-time radio access network intelligent controller from said access node; and means for carrying out a procedure to ensure that a configuration of at least one service subscription at the near-real-time radio access network intelligent controller corresponds to the information received from the access node.

According to an embodiment, the apparatus comprises means for including a list of service subscription identifiers regarding service subscriptions assumed to be active by said near-real-time radio access network intelligent controller in the service subscription audit request; and means for receiving, in said service subscription audit response, one or more lists of service subscription identifiers regarding service subscriptions having records held by the access node.

According to an embodiment, said one or more lists of service subscription identifiers comprise one or more of the following:

a first list of active service subscription identifiers matching one or more of the service subscription identifiers contained in the service subscription audit request;

a second list of unknown service subscription identifiers matching one or more of the service subscription identifiers contained in the service subscription audit request;

a third list of active service subscription identifiers not included in the service subscription identifiers contained in the service subscription audit request.

According to an embodiment, the apparatus comprises means for including a service subscription identifier regarding only one service subscription assumed to be active by said near-real-time radio access network intelligent controller in the service subscription audit request; and means for receiving, in said service subscription audit response, information about status of said one service subscription according to the records held by the access node.

According to an embodiment, the apparatus comprises means for initiating a procedure for resetting an interface between the near-real-time radio access network intelligent controller and the access node in response to all service subscriptions at the near-real-time radio access network intelligent controller being no more valid.

According to an embodiment, the apparatus comprises means for initiating a procedure for selectively deleting one or more incorrect service subscriptions at the near-real-time radio access network intelligent controller.

According to an embodiment, the apparatus comprises means for initiating a procedure for selectively adding one or more missing service subscriptions at the near-real-time radio access network intelligent controller.

According to an embodiment, said event is caused by a loss of synchronization between the near-real-time radio access network intelligent controller and the access node.

According to an embodiment, the apparatus is comprised in a radio access network intelligent controller.

According to a second aspect, there is provided an apparatus implementing functionalities of a near-real-time radio access network intelligent controller, comprising at least one processor and at least one memory, said at least one memory stored with computer program code thereon, the at least one memory and the computer program code configured to, with the at least one processor, cause the apparatus at least to perform: detect an event triggering a need for an auditing of service subscriptions at an associated access node; transmit a service subscription audit request to said access node; receive a service subscription audit response comprising information about any existing service subscription for said near-real-time radio access network intelligent controller from said access node; and carry out a procedure to ensure that a configuration of at least one service subscription at the near-real-time radio access network intelligent controller corresponds to the information received from the access node.

A method according to a third aspect comprises detecting, by a near-real-time radio access network intelligent controller, an event triggering a need for an auditing of service subscriptions at an associated access node; transmitting a service subscription audit request to said access node; receiving a service subscription audit response comprising information about any existing service subscription for said near-real-time radio access network intelligent controller from said access node; and carrying out a procedure to ensure that a configuration of at least one service subscription at the near-real-time radio access network intelligent controller corresponds to the information received from the access node.

Computer readable storage media according to further aspects comprise code for use by an apparatus, which when executed by a processor, causes the apparatus to perform the above methods.

BRIEF DESCRIPTION OF THE DRAWINGS

For a more complete understanding of the example embodiments, reference is now made to the following descriptions taken in connection with the accompanying drawings in which:

FIG. 6 shows a flow chart for a Near-RT RIC initiated RIC Subscription auditing procedure according to an embodiment.

DETAILED DESCRIPTION OF SOME EXAMPLE EMBODIMENTS

The following describes in further detail suitable apparatus and possible mechanisms for carrying out the interface setup procedures involving Near-RT RICs. While the following focuses on 5G networks, the embodiments as described further below are by no means limited to be implemented in said networks only, but they are applicable in any network and protocol entities supporting the interfaces of the Near-RT RICs or equivalent entities.

In the following, different exemplifying embodiments will be described using, as an example of an access architecture to which the embodiments may be applied, a radio access architecture based on Long Term Evolution Advanced (LTE Advanced, LTE-A) or new radio (NR, 5G), or beyond 5G, e.g., 6G, without restricting the embodiments to such an architecture, however. A person skilled in the art appreciates that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet protocol multimedia subsystems (IMS) or any combination thereof.

Figure 1:
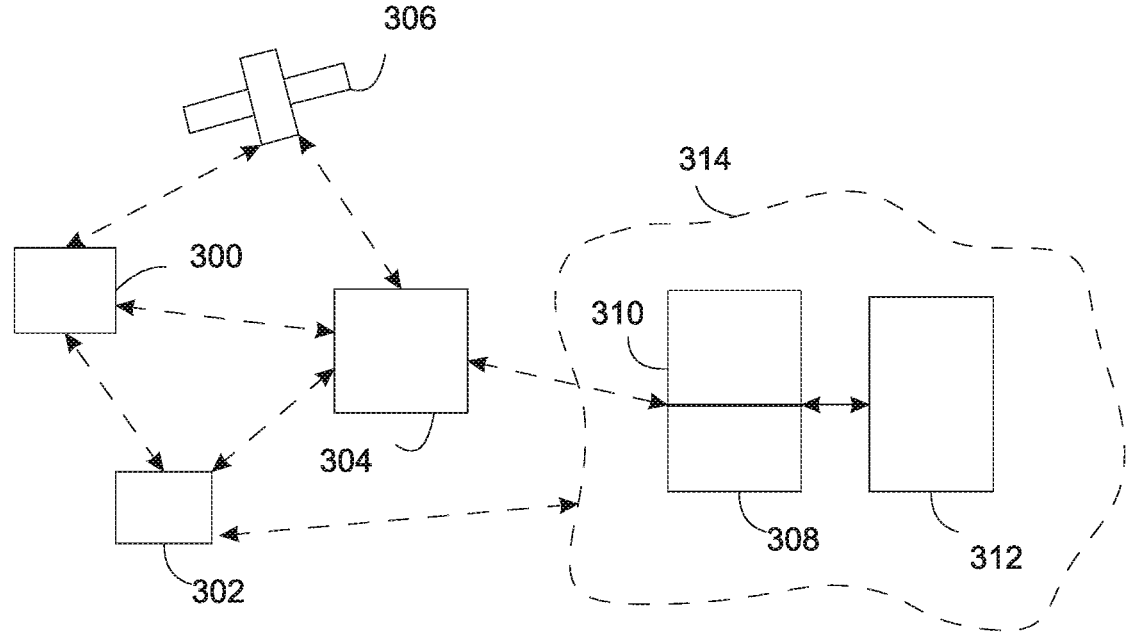
FIG. 1 shows a part of an exemplifying radio access network.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1. The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 300 and 302 configured to be in a wireless connection on one or more communication channels in a cell with an access node (such as (e/g)NodeB or a base transceiver station (BTS)) 304 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node (such as Integrated Access and Backhaul (IAB) node), host, server or access point etc. entity suitable for such a usage.

A communication system typically comprises more than one (e/g)NodeB in which case the (e/g)NodeBs may also be configured to communicate with one another over links, wired or wireless, designed for the purpose. These links may be used for signaling purposes. The (e/g)NodeB is or comprises a computing device configured to control the radio resources of communication system it is coupled to. The NodeB may also be referred to as a base station, an access point, an access node or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 310 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. The CN may comprise network entities or nodes that may be referred to management entities. Examples of the network entities comprise at least an Access and Mobility Management Function (AMF).

In 5G NR, the User Plane Function (UPF) may be used to separate the control plane and the user plane functions. Therein, the Packet Gateway (PGW) control and user plane functions may be decoupled, whereby the data forwarding component (PGW-U) may be decentralized, while the PGW-related signaling (PGW-C) may remain in the core. This allows packet processing and traffic aggregation to be performed closer to the network edge, increasing bandwidth efficiencies while reducing network.

The user device (also called a user equipment (UE), a user terminal, a terminal device, a wireless device, a mobile station (MS) etc.) illustrates one type of an apparatus to which resources on the air interface are allocated and assigned, and thus any feature described herein with a user device may be implemented with a corresponding network apparatus, such as a relay node, an eNB, and an gNB. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. Accordingly, the user device may be an IoT-device. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. The access nodes of the radio network form transmission/reception (TX/Rx) points (TRPs), and the UEs are expected to access networks of at least partly overlapping multi-TRPs, such as macro-cells, small cells, pico-cells, femto-cells, remote radio heads, relay nodes, etc. The access nodes may be provided with Massive MIMO antennas, i.e. very large antenna array consisting of e.g. hundreds of antenna elements, implemented in a single antenna panel or in a plurality of antenna panels, capable of using a plurality of simultaneous radio beams for communication with the UE. The UEs may be provided with MIMO antennas having an antenna array consisting of e.g. dozens of antenna elements, implemented in a single antenna panel or in a plurality of antenna panels. Thus, the UE may access one TRP using one beam, one TRP using a plurality of beams, a plurality of TRPs using one (common) beam or a plurality of TRPs using a plurality of beams.

The 4G/LTE networks support some multi-TRP schemes, but in 5G NR the multi-TRP features are enhanced e.g. via transmission of multiple control signals via multi-TRPs, which enables to improve link diversity gain. Moreover, high carrier frequencies (e.g., mmWaves) together with the Massive MIMO antennas require new beam management procedures for multi-TRP technology.

5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT (Radio Access Technology) operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

Frequency bands for 5G NR are separated into two frequency ranges: Frequency Range 1 (FR1) including sub-6 GHz frequency bands, i.e. bands traditionally used by previous standards, but also new bands extended to cover potential new spectrum offerings from 410 MHz to 7125 MHz, and Frequency Range 2 (FR2) including frequency bands from 24.25 GHz to 52.6 GHz. Thus, FR2 includes the bands in the mmWave range, which due to their shorter range and higher available bandwidth require somewhat different approach in radio resource management compared to bands in the FR1.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 312, or utilize services provided by them. The communication network may also be able to support the usage of cloud services, for example at least part of core network operations may be carried out as a cloud service (this is depicted in FIG. 1 by "cloud" 314). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head (RRH) or remote radio unit (RRU), radio unit (RU) or base station comprising radio parts. It is also possible that node operations will be distributed among a plurality of servers, nodes or hosts. Application of cloud-RAN architecture enables RAN real time functions being carried out at the RAN side (e.g. in a distributed unit, DU) and non-real time functions being carried out in a centralized manner (e.g. in a centralized unit, CU 308).

While Cloud RAN and Open RAN (ORAN or O-RAN) may have ties and may often be discussed together, they may also be considered as different technologies and one can be applied without the other. Open RAN defines, for example, open interfaces between network elements, while Cloud RAN may, for example, virtualize the baseband and separate baseband hardware and software. The open radio access network, O-RAN, as defined by the Open RAN Alliance, refers to a concept enabling interoperability of RAN elements between different vendors over a set of defined interfaces. Thus, O-RAN architecture for example enables baseband unit and radio unit components from different vendors to operate together.

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (e/gNB). It should be appreciated that MEC can be applied in 4G networks as well. The gNB is a next generation Node B (or, new Node B) supporting the 5G network (i.e., the NR).

5G may also utilize non-terrestrial nodes 306, e.g. access nodes, to enhance or complement the coverage of 5G service, for example by providing backhauling, wireless access to wireless devices, service continuity for machine-to-machine (M2M) communication, service continuity for Internet of Things (IoT) devices, service continuity for passengers on board of vehicles, ensuring service availability for critical communications and/or ensuring service availability for future railway/maritime/aeronautical communications. The non-terrestrial nodes may have fixed positions with respect to the Earth surface or the non-terrestrial nodes may be mobile non-terrestrial nodes that may move with respect to the Earth surface. The non-terrestrial nodes may comprise satellites and/or HAPSs (High Altitude Platform Stations). Satellite communication may utilize geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node 304 or by a gNB located on-ground or in a satellite.

A person skilled in the art appreciates that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home (e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto-or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

The Radio Resource Control (RRC) protocol is used in various wireless communication systems for defining the air interface between the UE and a base station, such as eNB/gNB. This protocol is specified by 3GPP in in TS 36.331 for LTE and in TS 38.331 for 5G. In terms of the RRC, the UE may operate in LTE and in 5G in an idle mode or in a connected mode, wherein the radio resources available for the UE are dependent on the mode where the UE at present resides. In 5G, the UE may also operate in inactive mode. In the RRC idle mode, the UE has no connection for communication, but the UE is able to listen to page messages. In the RRC connected mode, the UE may operate in different states, such as CELL DCH (Dedicated Channel), CELL FACH (Forward Access Channel), CELL PCH (Cell Paging Channel) and URA PCH (URA Paging Channel). The UE may communicate with the eNB/gNB via various logical channels like Broadcast Control Channel (BCCH), Paging Control Channel (PCCH), Common Control Channel (CCCH), Dedicated Control Channel (DCCH), Dedicated Traffic Channel (DTCH).

The transitions between the states are controlled by a state machine of the RRC. When the UE is powered up, it is in a disconnected mode/idle mode. The UE may transit to RRC connected mode with an initial attach or with a connection establishment. If there is no activity from the UE for a short time, eNB/gNB may suspend its session by moving to RRC Inactive and can resume its session by moving to RRC connected mode. The UE can move to the RRC idle mode from the RRC connected mode or from the RRC inactive mode.

The actual user and control data from network to the UEs is transmitted via downlink physical channels, which in 5G include Physical downlink control channel (PDCCH) which carries the necessary downlink control information (DCI), Physical Downlink Shared Channel (PDSCH), which carries the user data and system information for user, and Physical broadcast channel (PBCH), which carries the necessary system information to enable a UE to access the 5G network.

The user and control data from UE to the network is transmitted via uplink physical channels, which in 5G include Physical Uplink Control Channel (PUCCH), which is used for uplink control information including HARQ (Hybrid Automatic Repeat reQuest) feedback acknowledgments, scheduling request, and downlink channel-state information for link adaptation, Physical Uplink Shared Channel (PUSCH), which is used for uplink data transmission, and Physical Random Access Channel (PRACH), which is used by the UE to request connection setup referred to as random access.

5G specifications provide an option to split the internal structure of a gNB into entities called CU (Central Unit) and one or more DUs (Distributed Unit), which are connected by a F1 interface, as specified in 3GPP 38.473. The split may provide traffic aggregation in terms of one gNB CU serving a plurality of gNB DUs operating as the actual node points for the air interface. The gNB-CU may be further split to CU-CP (Control Plane) and CU-UP (User Plane), wherein E1 interface is provided between them. Information of available resources and load must be shared across these network entities to implement various RRM (Radio Resource Management) functionalities.

Figure 2:
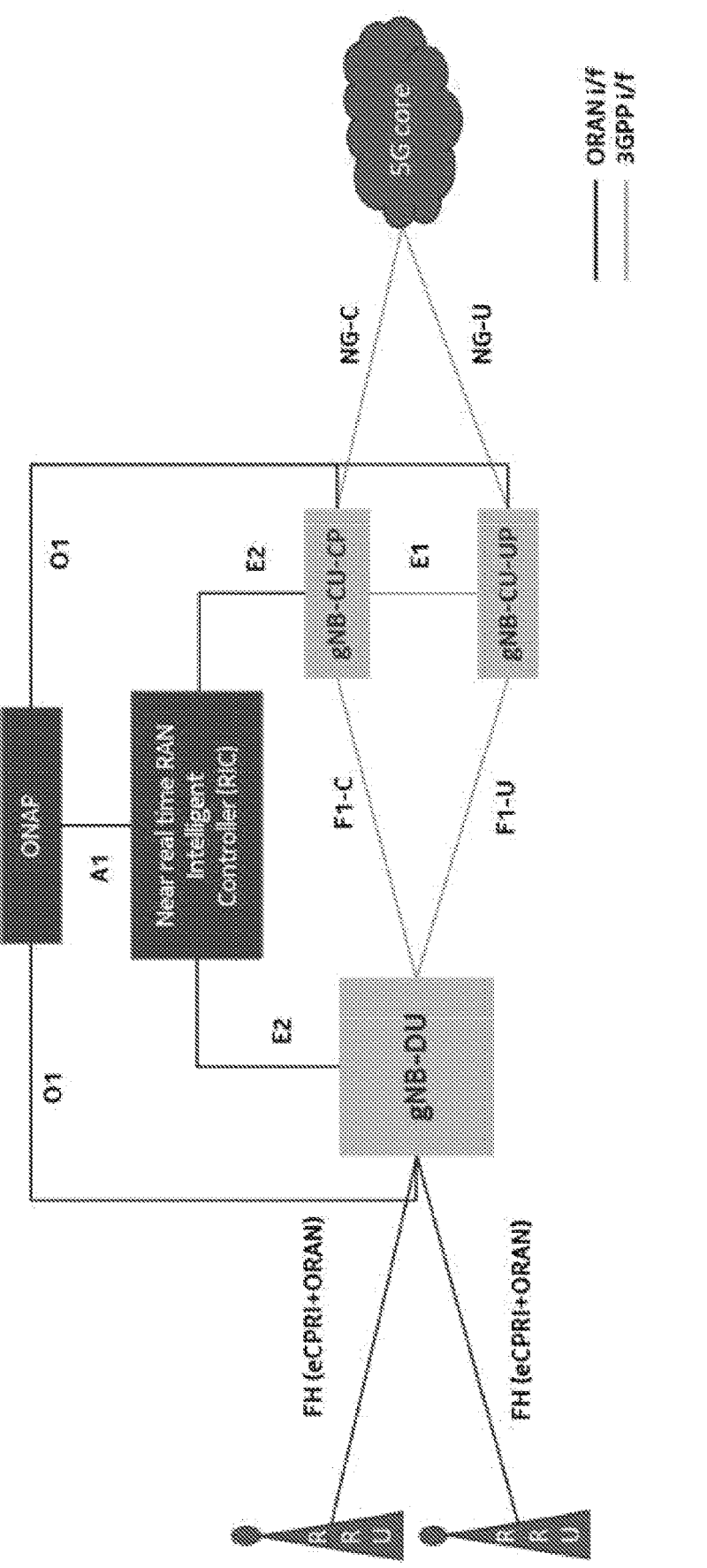
FIG. 2 illustrates overview on the 5G deployment model for the split gNB.

FIG. 2 provides a basic overview on the 5G deployment model for the split gNB. The gNB comprises a Centralized Unit (gNB-CU) and one or more Distributed Units (gNB-DUs) connected to the gNB-CU. gNB-CU is a logical node that includes the gNB functions like user data transfer, Mobility management, Radio access network sharing, Positioning, Session Management etc., except such functions, which are allocated exclusively to the gNB-DU. gNB-CU controls the operation of gNB-DUs over F1 interface.

As discussed above, O-RAN (Open Radio Access Network) provides open standards to complement what 3GPP has already defined in terms of functionalities, with a special focus on Radio Access Network (RAN) programmability and the application of ML/AI (Machine Learning/Artificial Intelligence) techniques. A RAN intelligent controller (RIC) is specified in ORAN WG3 (Working Group 3). The RIC may be divided into functions of a non-real-time (Non-RT) RIC and a near-real-time (Near-RT) RIC.

Figure 3:
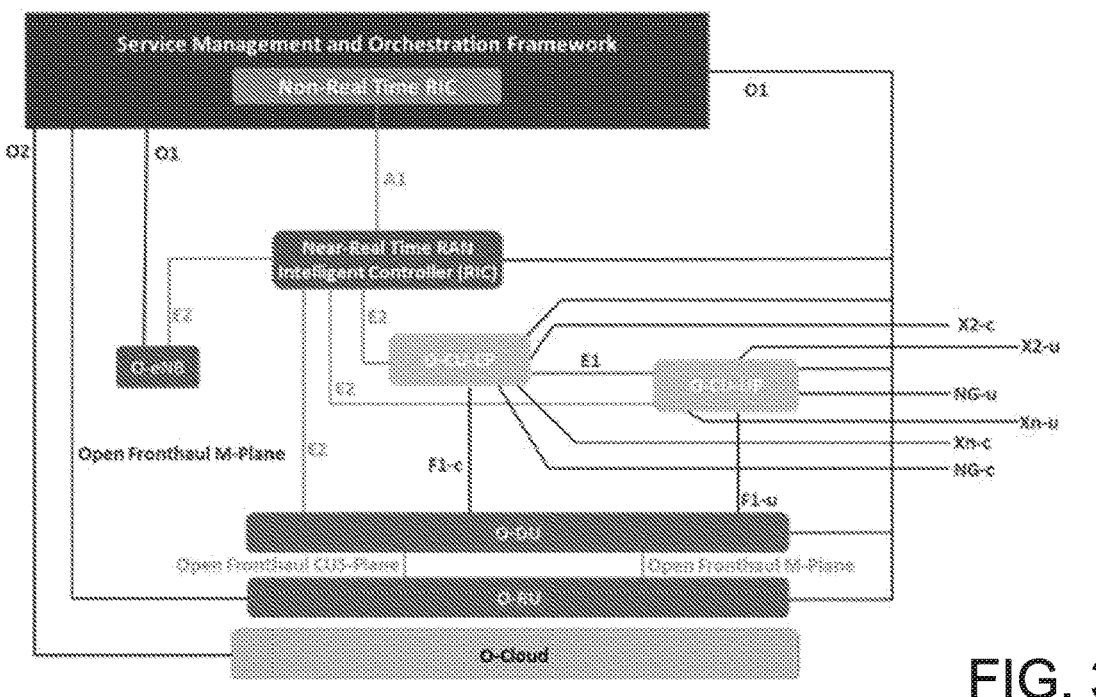
FIG. 3 shows an example of various interfaces among a variety of network elements in the O-RAN architecture provided with eNB and the split parts of gNB.

FIG. 3 shows various interfaces to a variety of network elements. It is noted that in this context of describing the O-RAN architecture the above nodes eNB and the split parts of gNB, i.e. CU-CP, CU-UP and DU are referred to as O-eNB, O-CU-CP, O-CU-UP and O-DU. The Non-RT RIC operates in the Service Management and Orchestration (SMO) domain and uses A1 interface to support intelligent RAN optimization by providing policy-based guidance, i.e., Declarative Policies, ML model management and Enrichment Information to guide the Near-RT RIC. A1 is defined in the document ORAN-WG2.A1.AP: A1 Application Protocol. It connects the Non-RT RIC to Near-RT RIC using a RESTful interface to send Declarative policies to Near-RT RIC.

The Near-RT RIC is a logical function that enables near-real-time control and optimization of RAN elements and resources via fine-grained (e.g. UE basis, network slice basis, Cell basis) data collection with measurements often provided at a faster rate than normally supported over network management interfaces and actions over E2 interface.

Figure 4:
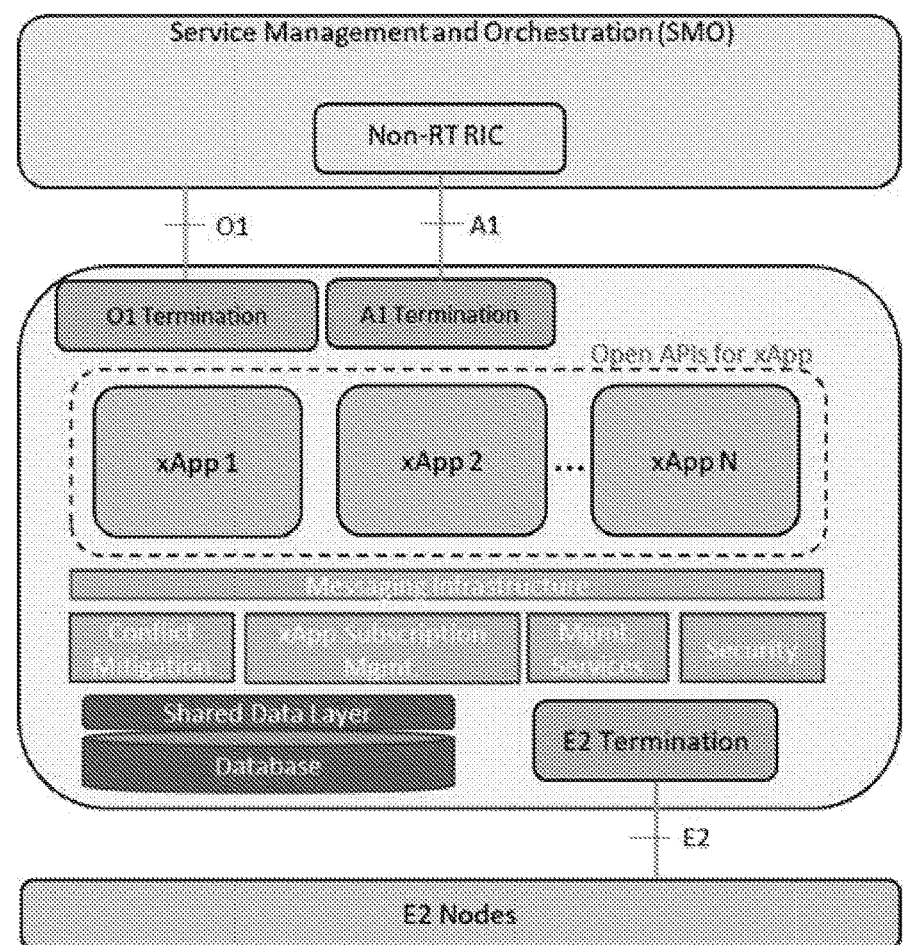
FIG. 4 shows an example of O-RAN Near-RT RIC architecture.

FIG. 4 shows an example of ORAN Near-RT RIC architecture. The Near-RT RIC comprises a database, which allows reading and writing of RAN and UE information, such as the configurations relating to E2 nodes, cells, bearers, flows, UEs and the mappings between them. The Near-RT RIC hosts one or more xApps that use E2 interface to collect near real-time information (e.g. UE basis, Cell basis) and provide value-added services. An xApp consists of a descriptor and a software package. The descriptor provides metadata on the xApp related to its version, provider, software package location, management information regarding fault, configuration, accounting, performance and security (FCAPS), and the data types that it takes as input as well as that it produces as output. The software package implements the logic that collects RAN-related information coming from E2 Nodes and provides optimized and intelligent RAN control decisions.

The Near-RT RIC further comprises xApp subscription management, which merges subscriptions from different xApps and provides unified data distribution to xApps. The conflict mitigation function resolves potentially overlapping or conflicting requests from multiple xApps. Moreover, the messaging infrastructure enables message interaction amongst Near-RT RIC internal functions.

The database may be used for storing and fetching the cell/UE/bearer-related data. Security function provides the security schemes of xApps. Management services provide FCAPS management by tracing the transactions, logging information, and collecting metrics to capture, analyze and report the Near-RT RIC status. Interface termination terminates the connections, allows message exchange with the related O-RAN component and additional functions depending on the needs of the specific interface termination. API management service supports the API registry, discovery, authentication, and event subscriptions.

E2 interface is provided between the Near-RT RIC and E2 nodes (e.g. O-eNB, O-CU-CP, O-CU-UP and O-DU or any of their combination). The E2 interface is defined in ORAN-WG3.E2GAP. E2 is a Control Plane interface and Imperative Policies can as well be sent over this interface to an "E2 Node", i.e. any RAN node (gNB, gNB-CU, gNB-CU-CP, gNB-DU, eNB, etc.) that exposes an E2 interface. Through the E2 interface, an E2 Node exposes the Near-RT RIC services, as mapped to E2 Functions and described according to E2 Service Models, through which the xApps are allowed to monitor and control. In return, xApps provide value-added services to E2 Node for the associated services.

E2 interface functions are divided into two categories: 1) Near-RT RIC services consisting of REPORT, CONTROL, INSERT, and POLICY, and 2) Near-RT MC support functions which include interface management and service update procedures. E2 interface functions are realized through E2 Application Protocol (E2AP) procedures. The current list of functions and related procedures are shown in Tables 1 and 2 below.

TABLE 1

| Initiated by | Elementary Procedure | Initiating Message | Successful Outcome Response message | Unsuccessful Outcome Response message |
|---|---|---|---|---|
| Near-RT RIC | RIC Subscription | RIC SUBSCRIPTION REQUEST | RIC SUBSCRIPTION RESPONSE | RIC SUBSCRIPTION FAILURE |
| Near-RT RIC | RIC Subscription Delete | RIC SUBSCRIPTION DELETE REQUEST | RIC SUBSCRIPTION DELETE RESPONSE | RIC SUBSCRIPTION DELETE FAILURE |
| E2 Node | RIC Service Update | RIC SERVICE UPDATE | RIC SERVICE UPDATE ACKNOWLEDGE | RIC SERVICE UPDATE FAILURE |
| Near-RT RIC | RIC Control | RIC CONTROL REQUEST | RIC CONTROL ACKNOWLEDGE | RIC CONTROL FAILURE |
| E2 Node | E2 Setup | E2 SETUP REQUEST | E2 SETUP RESPONSE | E2 SETUP FAILURE |
| E2 Node | E2 Node Configuration Update | E2 NODE CONFIGURATION UPDATE | E2 NODE CONFIGURATION UPDATE ACKNOWLEDGE | E2 NODE CONFIGURATION UPDATE FAILURE |
| Near-RT RIC | E2 Connection Update | E2 CONNECTION UPDATE | E2 CONNECTION UPDATE ACKNOWLEDGE | E2 CONNECTION UPDATE FAILURE |
| Near-RT RIC or E2 Node | Reset | RESET REQUEST | RESET RESPONSE | |
| Near-RT RIC or E2 Node | E2 Removal | E2 REMOVAL REQUEST | E2 REMOVAL RESPONSE | E2 REMOVAL FAILURE |

TABLE 2

| Initiated by | Elementary Procedure | Initiating Message |
|---|---|---|
| E2 Node | RIC Indication | RIC INDICATION |
| Near-RT RIC | RIC Service Query | RIC SERVICE QUERY |
| E2 Node | RIC Subscription Delete Required | RIC SUBSCRIPTION DELETE REQUIRED |
| E2 Node or Near-RT RIC | Error Indication | ERROR INDICATION |

RIC services are carried out by using subscription, indication and control E2AP procedures. REPORT is used by Near-RT RIC to subscribe to receiving a REPORT indication message from E2 Node upon trigger of the event specified in Near-RT RIC's subscription procedure. INSERT is used by Near-RT RIC to subscribe to receiving an INSERT indication message from E2 Node upon the specified event trigger. After the event occurrence, E2 Node sends the related INSERT indication message and suspends the associated procedures until CONTROL message from Near-RT RIC is received or until the waiting timer for CONTROL message arrival expires. CONTROL is used by Near-RT RIC via control procedure to initiate a new associated procedure or resume/cancel the suspended associated procedures in E2 Node. POLICY is used by Near-RT RIC to request the E2 Node to apply the POLICY after the occurrence of specific event trigger. Unlike INSERT, POLICY is not dependent on the CONTROL message and does not suspend associated procedures. The E2 node is expected to store the subscribed RIC Services and act accordingly and the Near-RT RIC is expected to track the list of active RIC Subscriptions.

Figure 5:
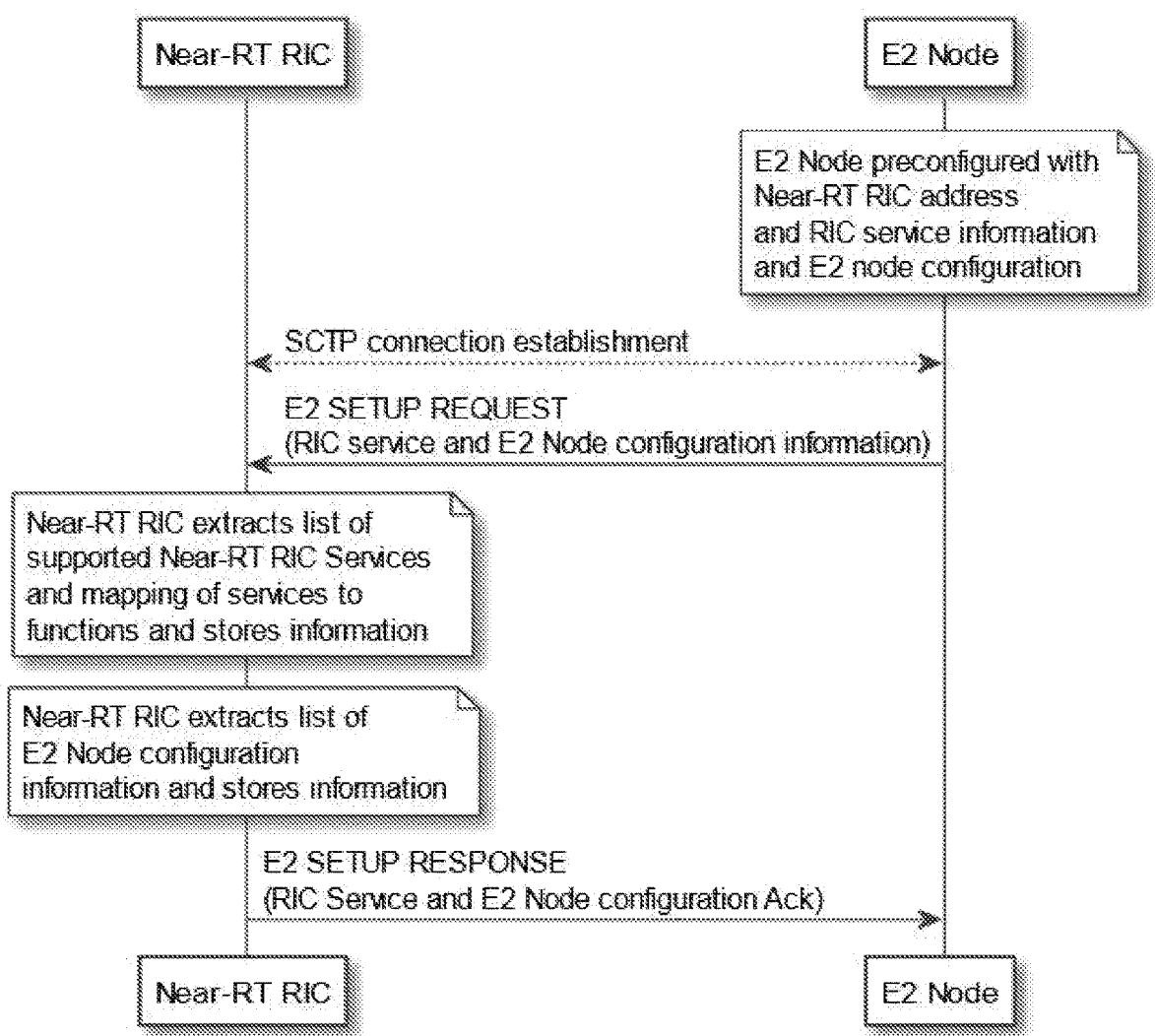
FIG. 5 shows a flow chart for a conventional E2 Node initiated E2 Setup procedure.

Near-RT RIC support functions provide functionalities and procedures regarding interface management and service update. Interface management functions facilitate E2 Setup, E2 Reset, E2 Node Configuration Update, Near-RT MC Service Update E2AP procedures as follows:

E2 Setup: This procedure is used by E2 Node to establish E2 interface to a Near-RT MC. During the procedure, which is shown in FIG. 5, E2 Node sends an E2 Setup Request to the Near-RT MC and provides therein a list of services and their mappings to E2 Functions within E2 Node to which E2 Node wishes to receive value-added services from Near-RT RIC. E2 Node also provides a list of E2 Node configuration information which is dependent on the E2 Node type. The Near-RT RIC extracts the lists and sends an E2 Setup Response as an acknowledgement for the successful E2 setup.

E2 Reset: This procedure can be initiated by either E2 Node or Near-RT RIC to reset the existing E2 interface in case of failure detection. Information that is already exchanged during procedures related to the service update, configuration update and interface setup are maintained; however, the subscriptions and ongoing processes are canceled.

E2 Connection Update procedure: This procedure can be initiated by Near-RT MC to update the existing E2 connection between Near-RT RIC and E2 Node. The update can be addition of a new SCTP connection or modification or removal of an existing SCTP connection, provided that there shall be at least one established SCTP connection.

E2 Node Configuration Update: It is used by E2 Node to inform the Near-RT MC of the changes to the E2 Node configuration information that was previously exchanged during interface setup.

Near-RT RIC Service Update: This is used by E2 Node to inform the Near-RT RIC of the changes to the list of services that was previously exposed to Near-RT MC during interface setup. This can also be triggered within E2 Node by Near-RT RIC through the use of RIC SERVICE QUERY message.

Thus, when the E2 Reset procedure terminates, all MC Subscriptions are to be deleted. Also, after E2 Removal and/or SCTP connection failure, the E2 interface is re-established by the E2 Node using an E2 Setup procedure, whereupon the termination of the E2 Setup procedure results in any RIC Subscription records concerning the previous connection to be deleted.

There have been considerations that in a case of E2 interface failure, the E2 Node could thereafter initiate an E2 Setup procedure with a "retention flag" indicating that existing RIC Subscriptions are to be retained and hence not deleted after the termination of the E2 Setup procedure. However, according to the current O-RAN specifications, this involves a plurality of problems.

In general, RIC Services subscribed to by the Near-RT RIC do not have a predetermined lifetime. Any RIC Service subscribed is assumed to be active/available until an explicit signaling is carried over the E2 IF to indicate otherwise.

However, an E2 node may encounter issues that could prevent it from providing a RIC Service that the Near-RT RIC had subscribed to earlier. As a result, a MC subscription database synchronization failure may take place. The underlying reasons may include at least the following:

Software failure within an E2 handling component
database errors/crash on the E2 Node
inter-process communication (IPC) failure
Board/hardware error impacting multiple components
etc., The current E2AP specs allow for the E2 Node to indicate to the RIC the non-availability of RAN Functions through the MC Service Update procedure and may use the MC Subscription Delete Required procedure to request for deletion of subscriptions. However, the E2 Node may not always have an updated list of subscriptions that it had accepted earlier in all the afore-mentioned scenarios.

Likewise, similar failure scenarios may also occur in the Near-RT RIC leading to loss of RIC subscription records and/or incorrect inclusion of RIC subscription records that failed to be accepted by the E2 Node.

Moreover, if the E2 Setup procedure were provided with an optional retention flag, the Near-RT RIC would need to trust that its existing records of RIC Subscriptions are still accurate.

In the above scenarios, there is currently no mechanism for the Near-RT RIC to query the status of the earlier agreed RIC subscriptions at any point in time and hence ensure that both nodes, i.e. the Near-RT RIC and the E2 Node, have the same list of active RIC Subscriptions.

In the following, an enhanced method for carrying out an RIC Subscription auditing procedure between an E2 Node and a Near-RT RIC will be described in more detail, in accordance with various embodiments.

The method is disclosed in flow chart of FIG. 6 as reflecting the operation of an apparatus, such as a near-real-time radio access network intelligent controller (near-RT RIC), wherein the method comprises detecting (600), by a near-real-time radio access network intelligent controller, an event triggering a need for an auditing of service subscriptions at an associated access node; transmitting (602), by said near-real-time radio access network intelligent controller, a service subscription audit request to said access node;

receiving (604) a service subscription audit response comprising information about any existing service subscription for said near-real-time radio access network intelligent controller from said access node; and carrying out (606) a procedure to ensure that a configuration of at least one service subscription at the near-real-time radio access network intelligent controller corresponds to the information received from the access node.

Thus, the procedure for the RIC Subscription auditing enables the Near-RT RIC to initiate an audit of any existing MC Subscriptions held in the E2 Node. This procedure may be initiated by the Near-RT RIC at any time, but typically in response to the Near-RT MC detecting an event that may be due to a loss of synchronization between the Near-RT MC and the E2 Node. Depending on the information provided by the E2 Node about the MC Subscriptions, the Near-RT RIC may take various actions to ensure that there is no misalignment of the active MC Subscriptions between the Near-RT RIC and the E2 Node. At simplest, the Near-RT RIC may only check that the information provided by the E2 Node about the RIC Subscriptions corresponds to the RIC Subscriptions records held by the Near-RT RIC, whereupon no further actions are needed. If the information provided by the E2 Node about the RIC Subscriptions does not correspond to the RIC Subscriptions records held by the Near-RT RIC, the Near-RT RIC takes corrective measures.

According to an embodiment, the method comprises including a list of service subscription identifiers regarding service subscriptions assumed to be active by said near-real-time radio access network intelligent controller in the service subscription audit request; and receiving, in said service subscription audit response, one or more lists of service subscription identifiers regarding service subscriptions having records held by the access node.

Hence, the Near-RT RIC may initiate the procedure by sending the service subscription audit request, which may be referred to, for example, as a RIC SUBSCRIPTION AUDIT REQUEST, to the E2 Node. The service subscription audit request may include a list of RIC Request IDs corresponding to Near-RT RIC knowledge of active RIC subscriptions. The list may be included, for example, in an information element referred to, for example, as a Current RIC Request ID list IE. When the Near-RT MC sends the RIC SUBSCRIPTION AUDIT REQUEST message, it may start a timer for a maximum duration of the audit procedure so as to minimize the risk of receiving outdated data from the E2 Node. The E2 Node replies with the service subscription audit response, which may be referred to, for example, as RIC SUBSCRIPTION AUDIT RESPONSE, and which includes the appropriate data.

According to an embodiment, said one or more lists of service subscription identifiers comprise one or more of the following:

a first list of active service subscription identifiers matching one or more of the service subscription identifiers contained in the service subscription audit request;
a second list of unknown service subscription identifiers matching one or more of the service subscription identifiers contained in the service subscription audit request;
a third list of active service subscription identifiers not included in the service subscription identifiers contained in the service subscription audit request.

Thus, if an appropriate information element, such as the Current RIC Request ID list IE, is present in the service subscription audit request, the E2 Node shall compare the list with its internal records of RIC Subscriptions. The E2

Node may include the list of RIC Request IDs matching the IDs included in the service subscription audit request in the first list, for example, in an information element referred to, for example, as Active RIC Request ID list IE. The E2 Node may also include the list of unknown RIC Request IDs included in the service subscription audit request in the second list, for example, in an information element referred to, for example, as Unknown RIC Request ID list IE. This may also take place in a situation, where the E2 Node has no records of any active services even if the Near-RT RIC presumes otherwise. The E2 Node may also include the list of active RIC Request IDs that were not contained in the service subscription audit request in the third list, for example, in an information element referred to, for example, as Missing RIC Request ID list IE.

According to an embodiment, the method comprises including a service subscription identifier regarding only one service subscription assumed to be active by said near-real-time radio access network intelligent controller in the service subscription audit request; and receiving, in said service subscription audit response, information about status of said one service subscription according to the records held by the access node.

Thus, instead of including a list of RIC Request IDs of active RIC subscriptions, the Near-RT RIC may include only one RIC Request ID in the service subscription audit request. The service ID may be included, for example, in an information element referred to, for example, as a Specific MC Request ID IE. If an appropriate information element, such as the Specific RIC Request ID IE, is present in the service subscription audit request, the E2 Node shall fetch the corresponding record of the specific RIC Request ID. The E2 Node may include the information, for example, in an information element referred to, for example, as RIC Actions Admitted List IE.

If none of the related information elements are present, the E2 Node shall retrieve the list with internal records of RIC Subscriptions and provide the list for example, in an information element referred to, for example, as Active MC Request ID list IE.

According to an embodiment, the method comprises initiating a procedure for resetting an interface between the near-real-time radio access network intelligent controller and the access node in response to all service subscriptions at the near-real-time radio access network intelligent controller being no more valid.

Thus, if the Near-RT RIC notices, e.g. based on data in the service subscription audit response, such as any of the above information elements, that all of the subscriptions agreed earlier are no more valid, the Near-RT RIC may initiate the E2AP: Reset procedure to remove all RIC Subscriptions. Thereby, the earlier non-valid subscriptions are removed from the Near-RT RIC and the whole set of currently active subscriptions are installed in Near-RT MC.

According to an embodiment, the method comprises initiating a procedure for selectively deleting one or more incorrect service subscriptions at the near-real-time radio access network intelligent controller.

Accordingly, if the Near-RT MC notices, e.g. based on data in the service subscription audit response, such as any of the above information elements, that a subset (i.e. one or more but not all) of the subscriptions agreed earlier are no more valid, the Near-RT RIC may use the RIC Subscription Delete procedure to selectively remove the incorrect subscriptions.

According to an embodiment, the method comprises initiating a procedure for selectively adding one or more missing service subscriptions at the near-real-time radio access network intelligent controller.

Hence, if the Near-RT RIC notices, e.g. based on data in the service subscription audit response, such as any of the above information elements, that a subset (i.e. one or more but not all) of the active subscriptions is lacking from the Near-RT MC, the Near-RT MC may use the RIC Subscription procedure to selectively add the missing subscriptions.

According to an embodiment, said event is caused by a loss of synchronization between the near-real-time radio access network intelligent controller and the access node.

As mentioned above, the Near-RT MC may initiate the RIC Subscription auditing procedure any time for auditing the current active RIC Subscriptions held in the E2 Node. A typical situation may relate to an event that the Near-RT RIC may interpret to be caused by a loss of synchronization between the Near-RT RIC and the E2 Node. At least the following situations may trigger the Near-RT RIC to initiate the RIC Subscription auditing procedure:

Any error experienced on the RIC side;
If the feedback reports, such as E2 REPORTs, from the E2 node suggest that the earlier accepted subscriptions are not working as expected;
Any procedural failure over E2AP, such as ERROR INDICATION received from the E2 Node;
Before sending any new E2AP: SUBSCRIPTION REQUEST;
After successful termination of E2 Setup procedure, especially if the retention flag is present in the E2 SETUP REQUEST message.

It is nevertheless noted that the event triggering the need for the RIC Subscription auditing procedure may be, for example, an internal decision of the Near-RT MC or a command from another logical or physical network element. The Near-RT MC may also be configured to initiate the RIC Subscription auditing procedure at predetermined intervals to ensure the validity of the RIC Subscriptions.

Figure 7:
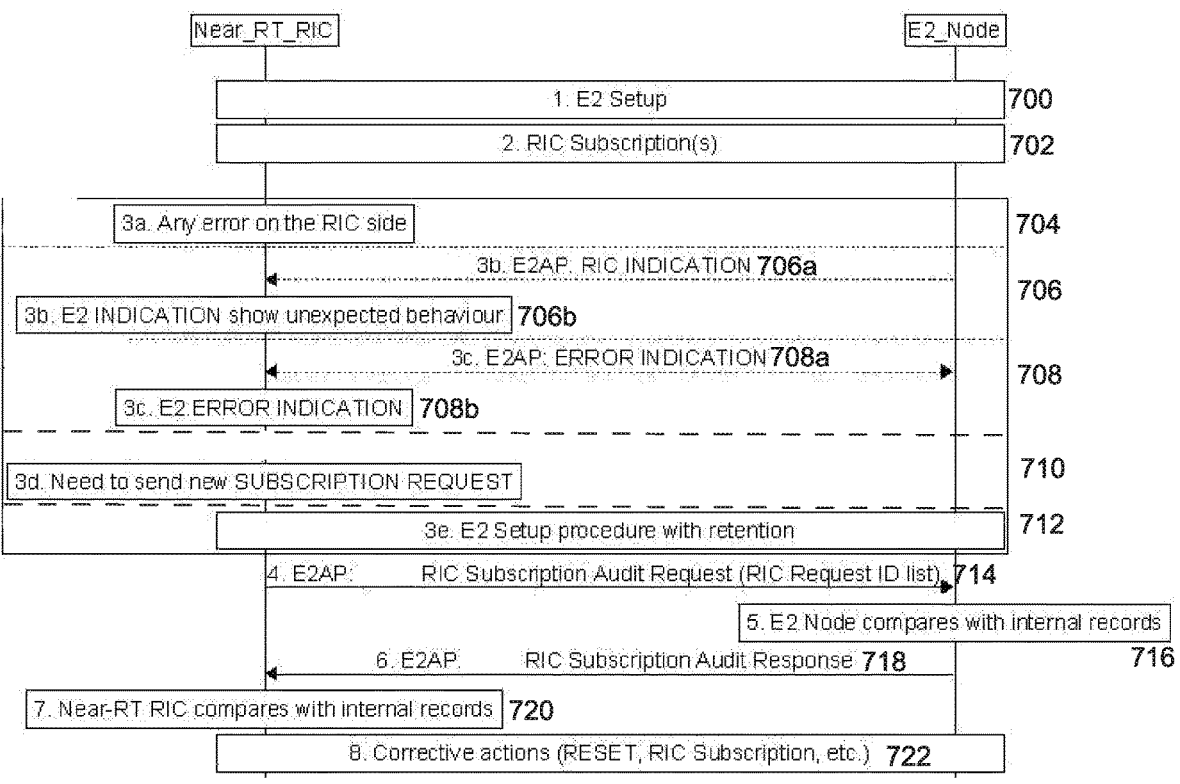
FIG. 7 shows an exemplified signalling chart of the RIC Subscription auditing procedure according to various embodiments.

The signalling chart of FIG. 7 illustrates an example of the MC Subscription auditing procedure according to various embodiments, as well as various scenarios that could lead to initiating the MC Subscription auditing procedure. The E2 Setup procedure (700) is carried out between the Near-RT MC and the E2 Node, whereupon one or more MC Subscriptions (702) are configured in the Near-RT RIC and stored in the records of the E2 Node.

FIG. 7 then exemplifies five different situations, which may precede the MC Subscription auditing procedure and wherein any of said situations may serve as the event for initiating said procedure. First, the Near-RT RIC may experience any error (704; RIC fault). In the second situation (706), the E2 Node may send a report, such as E2AP: RIC INDICATION (706a), based on which the Near-RT RIC concludes that there is unexpected behaviour (706b) regarding one or more RIC Subscriptions. The third situation refers to a procedural failure over E2AP (708), such as ERROR INDICATION (708a) received from the E2 Node, based on which the Near-RT RIC concludes an error happened in a procedure (708b). In the fourth situation (710), the Near-RT RIC may be re-initiated, whereupon the Near-RT MC may need to ensure the validity of the RIC Subscriptions. The fifth situation (712) refers to a termination of E2 Setup procedure supplemented with the retention flag in the E2 SETUP REQUEST message, whereupon the Near-RT RIC may need to ensure that the E2 Node has noticed the retention flag and retained the correct RIC Subscriptions.

In response to, for example, any of the above situations, the Near-RT RIC initiates the RIC Subscription auditing procedure by sending a RIC service subscription audit request (714) provided with an information element, such as Current MC Request ID list IE to the E2 Node. The E2 Node shall compare the content of the information element with its internal records of RIC Subscriptions (716). The E2 Node sends a RIC service subscription audit response (718) to the Near-RT RIC, wherein the E2 Node may include the list of RIC Request IDs matching the IDs included in the service subscription audit request in an information element, such as Active MC Request ID list IE. The Near-RT RIC compares its own internal records of RIC Subscriptions to the information received from the E2 Node (720). In a case of any invalid or missing RIC Subscriptions, appropriate corrective actions are initiated between the Near-RT RIC and the E2 Node (722).

The method and the embodiments related thereto may be implemented in an apparatus implementing functionalities of a near-real-time radio access network intelligent controller. An apparatus according to an aspect comprises means for implementing a near-real-time radio access network intelligent controller; means for detecting an event triggering a need for an auditing of service subscriptions at an associated access node; means for transmitting a service subscription audit request to said access node; means for receiving a service subscription audit response comprising information about any existing service subscription for said near-real-time radio access network intelligent controller from said access node; and means for carrying out a procedure to ensure that a configuration of at least one service subscription at the near-real-time radio access network intelligent controller corresponds to the information received from the access node.

According to an embodiment, the apparatus comprises means for including a list of service subscription identifiers regarding service subscriptions assumed to be active by said near-real-time radio access network intelligent controller in the service subscription audit request; and means for receiving, in said service subscription audit response, one or more lists of service subscription identifiers regarding service subscriptions having records held by the access node.

According to an embodiment, said one or more lists of service subscription identifiers comprise one or more of the following:

a first list of active service subscription identifiers matching one or more of the service subscription identifiers contained in the service subscription audit request;

a second list of unknown service subscription identifiers matching one or more of the service subscription identifiers contained in the service subscription audit request;

a third list of active service subscription identifiers not included in the service subscription identifiers contained in the service subscription audit request.

According to an embodiment, the apparatus comprises means for including a service subscription identifier regarding only one service subscription assumed to be active by said near-real-time radio access network intelligent controller in the service subscription audit request; and means for receiving, in said service subscription audit response, information about status of said one service subscription according to the records held by the access node.

According to an embodiment, the apparatus comprises means for initiating a procedure for resetting an interface between the near-real-time radio access network intelligent controller and the access node in response to all service subscriptions at the near-real-time radio access network intelligent controller being no more valid.

According to an embodiment, the apparatus comprises means for initiating a procedure for selectively deleting one or more incorrect service subscriptions at the near-real-time radio access network intelligent controller.

According to an embodiment, the apparatus comprises means for initiating a procedure for selectively adding one or more missing service subscriptions at the near-real-time radio access network intelligent controller.

According to an embodiment, said event is caused by a loss of synchronization between the near-real-time radio access network intelligent controller and the access node.

The means as referred to herein and in related embodiments may comprise at least one processor; and at least one memory including computer program code, the at least one memory and computer program code configured to, with the at least one processor, cause the performance of the apparatus.

An apparatus implementing functionalities of a near-real-time radio access network intelligent controller according to a further aspect comprises at least one processor and at least one memory, said at least one memory stored with computer program code thereon, the at least one memory and the computer program code configured to, with the at least one processor, cause the apparatus at least to perform: detect an event triggering a need for an auditing of service subscriptions at an associated access node; transmit a service subscription audit request to said access node; receive a service subscription audit response comprising information about any existing service subscription for said near-real-time radio access network intelligent controller from said access node; and carry out a procedure to ensure that a configuration of at least one service subscription at the near-real-time radio access network intelligent controller corresponds to the information received from the access node.

According to an embodiment, the apparatus comprises computer program code causing the apparatus to: include a list of service subscription identifiers regarding service subscriptions assumed to be active by said near-real-time radio access network intelligent controller in the service subscription audit request; and receive, in said service subscription audit response, one or more lists of service subscription identifiers regarding service subscriptions having records held by the access node.

According to an embodiment, said one or more lists of service subscription identifiers comprise one or more of the following:

a first list of active service subscription identifiers matching one or more of the service subscription identifiers contained in the service subscription audit request;

a second list of unknown service subscription identifiers matching one or more of the service subscription identifiers contained in the service subscription audit request;

a third list of active service subscription identifiers not included in the service subscription identifiers contained in the service subscription audit request.

According to an embodiment, the apparatus comprises computer program code causing the apparatus to: include a service subscription identifier regarding only one service subscription assumed to be active by said near-real-time radio access network intelligent controller in the service subscription audit request; and receive, in said service subscription audit response, information about status of said one service subscription according to the records held by the access node.

According to an embodiment, the apparatus comprises computer program code causing the apparatus to: initiate a procedure for resetting an interface between the near-real-time radio access network intelligent controller and the access node in response to all service subscriptions at the near-real-time radio access network intelligent controller being no more valid.

According to an embodiment, the apparatus comprises computer program code causing the apparatus to: initiate a procedure for selectively deleting one or more incorrect service subscriptions at the near-real-time radio access network intelligent controller.

According to an embodiment, the apparatus comprises computer program code causing the apparatus to: initiate a procedure for selectively adding one or more missing service subscriptions at the near-real-time radio access network intelligent controller.

According to an embodiment, the apparatus as described in any of the above embodiments as implementing functionalities of a near-real-time radio access network intelligent controller may be comprised in a radio access network intelligent controller.

Such apparatuses may comprise e.g. the functional units disclosed in FIG. 4 for implementing the embodiments.

A further aspect relates to a computer program product, stored on a non-transitory memory medium, comprising computer program code, which when executed by at least one processor, causes an apparatus at least to perform: detect an event triggering a need for an auditing of service subscriptions at an associated access node; transmit a service subscription audit request to said access node; receive a service subscription audit response comprising information about any existing service subscription for said near-real-time radio access network intelligent controller from said access node; and carry out a procedure to ensure that a configuration of at least one service subscription at the near-real-time radio access network intelligent controller corresponds to the information received from the access node.

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended examples. However, all such and similar modifications of the teachings of this invention will still fall within the scope of this invention.

The invention claimed is:

1. An apparatus comprising:
   at least one processor; and
   at least one memory storing instructions that, when executed by the at least one processor, cause the apparatus to perform:
   implementing a near-real-time radio access network intelligent controller;
   detecting an event triggering a need for an auditing of service subscriptions at an associated access node;
   transmitting a service subscription audit request to said access node, wherein said service subscription audit request comprises a list of service subscription identifiers regarding service subscriptions assumed to be active by said near-real-time radio access network intelligent controller;
   receiving a service subscription audit response comprising information about any existing service subscription for said near-real-time radio access network intelligent controller from said access node, wherein said service subscription audit response comprises one or more lists of service subscription identifiers regarding service subscriptions having records held by the access node; and
   carrying out a procedure to ensure that a configuration of at least one service subscription at the near-real-time radio access network intelligent controller corresponds to the information received from the access node.

2. The apparatus according to claim 1, wherein said one or more lists of service subscription identifiers comprise one or more of the following:
   a first list of active service subscription identifiers matching one or more of the service subscription identifiers contained in the service subscription audit request;
   a second list of unknown service subscription identifiers matching one or more of the service subscription identifiers contained in the service subscription audit request;
   a third list of active service subscription identifiers not included in the service subscription identifiers contained in the service subscription audit request.

3. The apparatus according to claim 1, wherein the instructions, when executed by the at least one processor, cause the apparatus to further perform:
   including a service subscription identifier regarding only one service subscription assumed to be active by said near-real-time radio access network intelligent controller in the service subscription audit request; and
   receiving, in said service subscription audit response, information about status of said one service subscription according to the records held by the access node.

4. The apparatus according to claim 1, wherein the instructions, when executed by the at least one processor, cause the apparatus to further perform:
   initiating a procedure for resetting an interface between the near-real-time radio access network intelligent controller and the access node in response to all service subscriptions at the near-real-time radio access network intelligent controller being no more valid.

5. The apparatus according to claim 1, wherein the instructions, when executed by the at least one processor, cause the apparatus to further perform:

initiating a procedure for selectively deleting one or more incorrect service subscriptions at the near-real-time radio access network intelligent controller.

6. The apparatus according to claim 1, wherein the instructions, when executed by the at least one processor, cause the apparatus to further perform:

initiating a procedure for selectively adding one or more missing service subscriptions at the near-real-time radio access network intelligent controller.

7. The apparatus according to claim 1, wherein said event is caused by a loss of synchronization between the near-real-time radio access network intelligent controller and the access node.

8. The apparatus according to claim 1, wherein the apparatus is comprised in a radio access network intelligent controller.

9. A method, comprising:

detecting, by a near-real-time radio access network intelligent controller, an event triggering a need for an auditing of service subscriptions at an associated access node;

transmitting a service subscription audit request to said access node, wherein said service subscription audit request comprises a list of service subscription identifiers regarding service subscriptions assumed to be active by said near-real-time radio access network intelligent controller;

receiving a service subscription audit response comprising information about any existing service subscription for said near-real-time radio access network intelligent controller from said access node, wherein said service subscription audit response comprises one or more lists of service subscription identifiers regarding service subscriptions having records held by the access node; and carrying out a procedure to ensure that a configuration of at least one service subscription at the near-real-time radio access network intelligent controller corresponds to the information received from the access node.

10. The method according to claim 9, wherein said one or more lists of service subscription identifiers comprise one or more of the following:

a first list of active service subscription identifiers matching one or more of the service subscription identifiers contained in the service subscription audit request;

a second list of unknown service subscription identifiers matching one or more of the service subscription identifiers contained in the service subscription audit request;

a third list of active service subscription identifiers not included in the service subscription identifiers contained in the service subscription audit request.

11. The method according to claim 9, comprising including a service subscription identifier regarding only one service subscription assumed to be active by said near-real-time radio access network intelligent controller in the service subscription audit request; and receiving, in said service subscription audit response, information about status of said one service subscription according to the records held by the access node.

12. The method according to claim 9, comprising initiating a procedure for resetting an interface between the near-real-time radio access network intelligent controller and the access node in response to all service subscriptions at the near-real-time radio access network intelligent controller being no more valid.

13. The method according to claim 9, comprising initiating a procedure for selectively deleting one or more incorrect service subscriptions at the near-real-time radio access network intelligent controller.

14. The method according to claim 9, comprising initiating a procedure for selectively adding one or more missing service subscriptions at the near-real-time radio access network intelligent controller.

15. The method according to claim 9, wherein said event is caused by a loss of synchronization between the near-real-time radio access network intelligent controller and the access node.

16. The method according to claim 9, wherein said near-real-time radio access network intelligent controller is comprised in a radio access network intelligent controller.

* * * * *